(12) United States Patent
Moon et al.

(10) Patent No.: US 9,084,249 B2
(45) Date of Patent: Jul. 14, 2015

(54) COMMUNICATION METHOD FOR A TERMINAL IN A MULTI-CARRIER SYSTEM USING A PLURALITY OF COMPONENT CARRIERS

(75) Inventors: Sung Ho Moon, Anyang-si (KR); Jae Hoon Chung, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 13/583,574

(22) PCT Filed: Mar. 4, 2011

(86) PCT No.: PCT/KR2011/001519
§ 371 (c)(1),
(2), (4) Date: Jan. 16, 2013

(87) PCT Pub. No.: WO2011/111955
PCT Pub. Date: Sep. 15, 2011

(65) Prior Publication Data
US 2013/0155969 A1   Jun. 20, 2013

Related U.S. Application Data

(60) Provisional application No. 61/311,779, filed on Mar. 9, 2010.

(30) Foreign Application Priority Data

Jan. 19, 2011   (KR) .................. 10-2011-0005235

(51) Int. Cl.
*H04W 4/00*     (2009.01)
*H04W 72/04*    (2009.01)
*H04L 5/00*     (2006.01)

(52) U.S. Cl.
CPC ............. *H04W 72/042* (2013.01); *H04L 5/001* (2013.01); *H04L 5/0098* (2013.01)

(58) Field of Classification Search
CPC ............................ H04W 72/042; H04L 5/001
USPC ......................................................... 370/329
See application file for complete search history.

(56) References Cited

U.S. PATENT DOCUMENTS

| | | |
|---|---|---|
| 2009/0175243 A1 | 7/2009 | Han et al. |
| 2009/0300456 A1 | 12/2009 | Pelletier et al. |
| 2009/0316659 A1 | 12/2009 | Lindoff et al. |
| 2010/0118720 A1 | 5/2010 | Gauvreau et al. |

(Continued)

*Primary Examiner* — Shripal Khajuria
*Assistant Examiner* — Faisal Choudhury
(74) *Attorney, Agent, or Firm* — McKenna Long & Aldridge LLP

(57) ABSTRACT

Provided is a communication method of a terminal in a multi-carrier system using a plurality of component carriers. The method includes: receiving a reconfiguration message indicating whether downlink control information (DCI) includes a carrier indication field (CIF); receiving a plurality of DCIs indicating a resource used to transmit a reconfiguration complete message in response to the reconfiguration message; and transmitting the reconfiguration complete message on the basis of resource allocation information included in DCI which is successfully decoded among the plurality of DCIs, wherein the plurality of DCIs include first DCI used before the CIF of the DCI is reconfigured by the reconfiguration message and second DCI used after the CIF of the DCI is reconfigured by the reconfiguration message.

3 Claims, 20 Drawing Sheets

(56) References Cited

U.S. PATENT DOCUMENTS

2012/0009923 A1* 1/2012 Chen et al. .................. 455/434
2013/0010709 A1* 1/2013 Earnshaw et al. ............ 370/329
2013/0039302 A1* 2/2013 Miki et al. ................... 370/329
2013/0044711 A1* 2/2013 Aiba et al. ................... 370/329
2014/0269585 A1* 9/2014 Earnshaw et al. ............ 370/329

* cited by examiner (a) # of DL CC (component carrier) ># of UL CC (b) # of UL CC > # of DL CC

COMMUNICATION METHOD FOR A TERMINAL IN A MULTI-CARRIER SYSTEM USING A PLURALITY OF COMPONENT CARRIERS

This Application is a 35 U.S.C. §371 National Stage Entry of International Application No. PCT/KR2011/001519, filed Mar. 4, 2011 and claims the benefit of U.S. Provisional Application No. 61/311,779, filed Mar. 9, 2010, and Korean Application No: 10-2011-0005235, filed Jan. 19, 2011, all of which are incorporated by reference in their entirety herein.

TECHNICAL FIELD

The present invention relates to wireless communications, and more particularly, to a communication method of a terminal in a multi-carrier system.

BACKGROUND ART

One of the most important requirements of a next generation wireless communication system is to support a required high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which requires separate bands capable of operating respective independent systems is satisfied, and a carrier aggregation (CA) is introduced. In concept, the CA aggregates a plurality of bands into one system. In this case, a band that can be independently managed is defined as a component carrier (CC).

To support growing transmission capacity, the 3GPP LTE-A or the 802.16m has recently expanded its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a carrier aggregation system uses a plurality of CCs, and in this sense, can be called a multi-carrier system.

A CC allocated to the terminal in the multi-carrier system can be changed for various reasons such as a channel environment, a transmission data amount, etc. For example, three CCs can be allocated in such a manner that one CC is added to the terminal while communication is performed by allocating two CCs to the terminal. Alternatively, two CCs can be allocated in such a manner that one CC is removed while communication is performed by allocating three CCs.

As such, when there is a change in the CCs allocated to the terminal, downlink control information transmitted by a base station can be reconfigured from a configuration not including a carrier indication field to a configuration including the carrier indication field. In this case, a message for indicating a reconfiguration in the carrier indication field and a message for reporting the completion of the reconfiguration in the carrier indication field are signaled between the base station and the terminal. However, if an error occurs in this process, there may be a case where the terminal is not able to correctly decode downlink control information transmitted by the BS.

SUMMARY OF INVENTION

Technical Problem

The present invention provides a communication method of a terminal in a multi-carrier system.

Technical Solution

According to one embodiment of the present invention, a communication method of a terminal in a multi-carrier system using a plurality of component carriers is provided. The method includes: receiving a reconfiguration message indicating whether downlink control information (DCI) includes a carrier indication field (CIF); receiving a plurality of DCIs indicating a resource used to transmit a reconfiguration complete message in response to the reconfiguration message; and transmitting the reconfiguration complete message on the basis of resource allocation information included in DCI which is successfully decoded among the plurality of DCIs, wherein the plurality of DCIs include first DCI used before the CIF of the DCI is reconfigured by the reconfiguration message and second DCI used after the CIF of the DCI is reconfigured by the reconfiguration message.

In the aforementioned aspect of the present invention, the method may further include transmitting an acknowledgment (ACK)/not-acknowledgement (NACK) signal according to whether the reconfiguration message is successfully decoded.

In addition, if the terminal transmits the ACK signal, the reconfiguration complete message may be transmitted on the basis of resource allocation information included in the second DCI.

In addition, if the terminal transmits the NACK signal, the reconfiguration complete message may be transmitted on the basis of resource allocation information included in the first DCI.

In addition, the reconfiguration message may be transmitted using a radio resource control (RRC) signal.

In addition, the reconfiguration complete message may include information indicating a success of the reconfiguration or information indicating a failure of the reconfiguration according to the reconfiguration message.

In addition, the first DCI may not include the CIF, and the second DCI may include the CIF.

According to another aspect of the present invention, a communication method of a terminal in a multi-carrier system using a plurality of component carriers is provided. The method includes: receiving a plurality of DCIs in any one of a plurality of DL CCs; and transmitting an uplink (UL) signal on the basis of resource allocation information included in any one of the plurality of DCIs, wherein the plurality of DCIs include DCI including a carrier indication field (CIF) and DCI not including the CIF, wherein the any one of DCIs does not include the CIF, and wherein the UL signal includes a reconfiguration complete message as a response for a reconfiguration message indicating whether DCI transmitted by a base station includes the CIF.

In the aforementioned aspect of the present invention, the DCI not including the CIF among the plurality of DCIs may be blind-decoded in a predetermined search space.

In addition, the predetermined search space may be a common search space.

In addition, the plurality of DCIs may be blind-decoded in different search spaces according to whether the CIF is included.

In addition, the DCI not including the CIF may be used for non-cross-carrier scheduling.

Advantageous Effects

According to the present invention, communication can be performed without an error between a base station and a terminal even if downlink control information transmitted to the terminal is reconfigured in a multi-carrier system.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

For clarity, the following description assumes a situation where the present invention applies to an LTE-A system. However, technical features of the present invention are not limited thereto.

Figure 1:
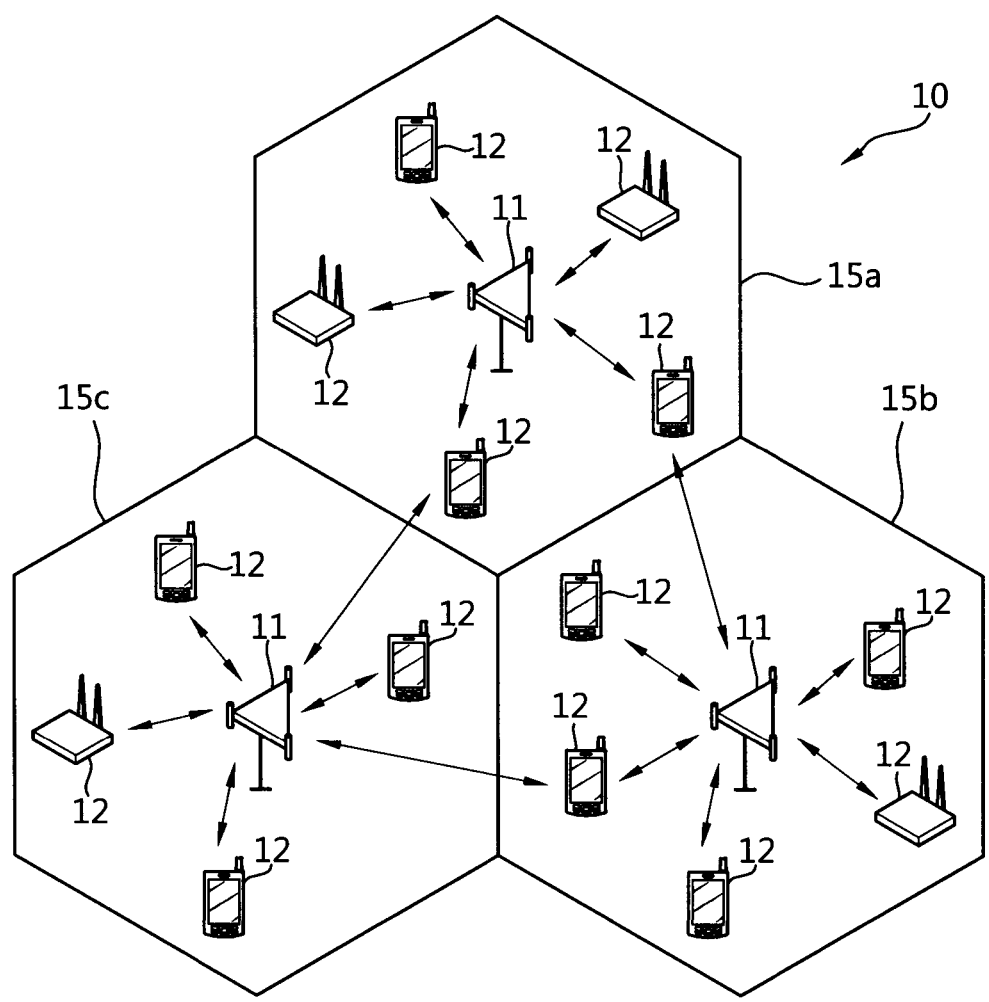
FIG. 1 is an example of a wireless communication system according to an embodiment of the present invention.

FIG. 1 is an example of a wireless communication system according to an embodiment of the present invention.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. A BS which provides a communication service to the serving cell is called a serving BS. Since the wireless communication system is a cellular system, there may be a different cell adjacent to the serving cell. The different cell adjacent to the serving cell is called a neighboring cell. A BS which provides a communication service to the adjacent cell is called a neighbor BS. The serving cell and the neighbor cell are determined relatively with respect to the UE.

In general, a downlink implies communication from the BS 11 to the UE 12, and an uplink implies communication from the UE 12 to the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

A Tx antenna implies a physical or logical antenna used to transmit one signal or stream. An Rx antenna implies a physical or logical antenna used to receive one signal or stream.

Figure 2:
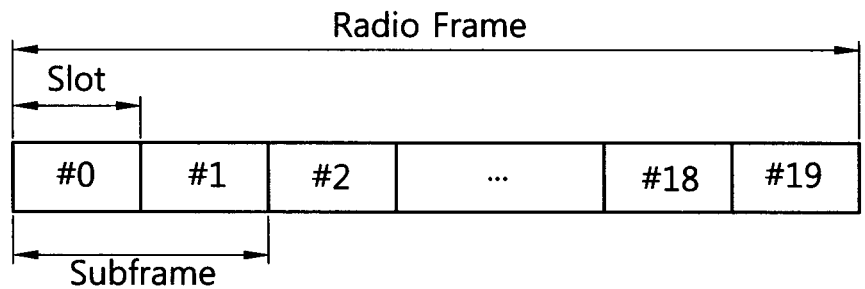
FIG. 2 shows a structure of a radio frame in $3^{rd}$ generation partnership project (3GPP) long term evolution (LTE).

FIG. 2 shows a structure of a radio frame in 3GPP LTE.

The section 5 of 3GPP (3rd Generation Partnership Project) TS 36.211 V8.2.0 (2008 March) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. The OFDM symbol is for representing one symbol period. The OFDM symbol can be referred to as other terms. For example, the OFDM symbol can also be referred to as an orthogonal frequency division multiple access (OFDMA) symbol, or when single carrier-frequency division multiple access (SC-FDMA) is used as an uplink multiple-access scheme, the OFDM symbol can also be referred to as an SC-FDMA symbol.

In 3GPP LTE, it is defined such that one slot includes 7 OFDM symbols in a normal cyclic prefix (CP) and one slot includes 6 OFDM symbols in an extended CP.

The above radio frame structure is shown for exemplary purposes only. Thus, the number of subframes included in the radio frame or the number of slots included in the subframe or the number of OFDM symbols included in the slot may change variously.

Figure 3:
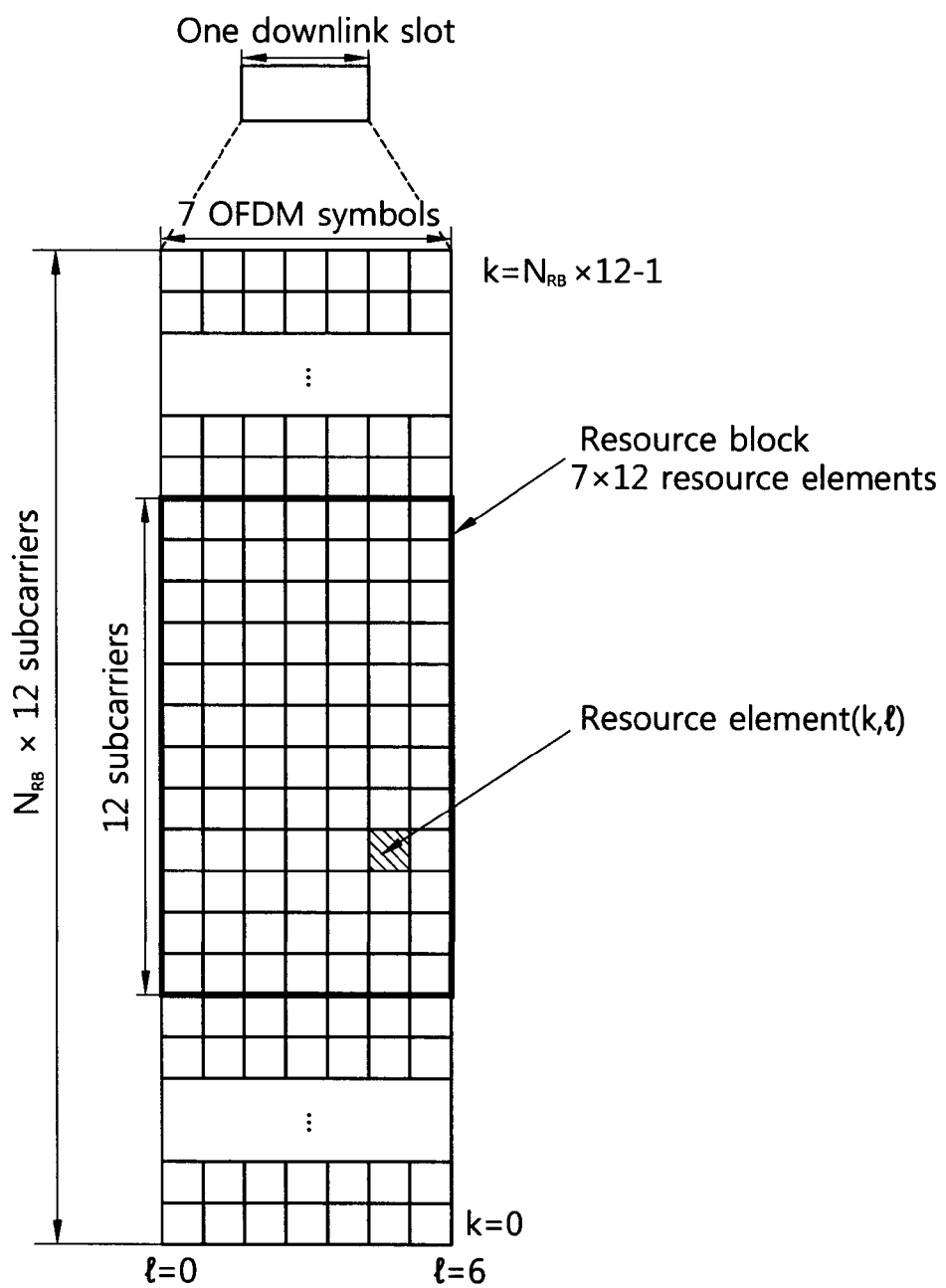
FIG. 3 shows an example of a resource grid for one downlink (DL) slot.

FIG. 3 shows an example of a resource grid for one downlink slot.

The downlink slot includes a plurality of OFDM symbols in a time domain and a plurality of $N_{RB}$ resource blocks (RBs) in a frequency domain. The RB is a resource allocation unit, and includes one slot in the time domain and a plurality of contiguous subcarriers in the frequency domain.

The number $N_{RB}$ of RBs included in the downlink slot depends on a downlink transmission bandwidth determined in a cell. For example, in an LTE system, $N_{RB}$ may be any one value in the range of 60 to 110. An uplink slot may have the same structure as the downlink slot.

Each element on the resource grid is referred to as a resource element (RE). The RE on the resource grid can be identified by an index pair (k, l) within the slot. Herein, k (k=0, . . . , $N_{RB}$×12−1) denotes a subcarrier index in the frequency domain, and l (l=0, . . . , 6) denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a CP length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
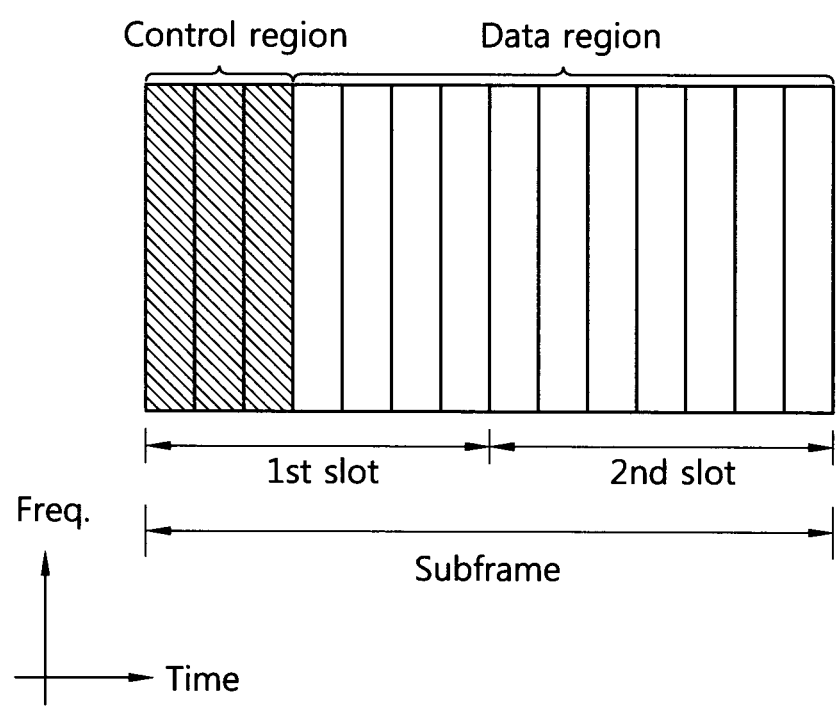
FIG. 4 shows a structure of a DL subframe.

FIG. 4 shows a structure of a downlink subframe.

The downlink subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region. The PDSCH implies a channel in which a BS transmits data to a UE.

A physical control format indicator channel (PCFICH), a physical hybrid ARQ indicator channel (PHICH), a physical downlink control channel (PDCCH), or the like can be transmitted in the control region. The PCFICH is a physical channel for transmitting a format indicator indicating a format of the PDCCH, that is, the number of OFDM symbols constituting the PDCCH, to the UE. The PCFICH is included in every subframe. The format indicator can also be referred to as a control format indicator (CFI).

The PHICH carries an HARQ ACK/NACK signal in response to uplink transmission.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

Figure 5:
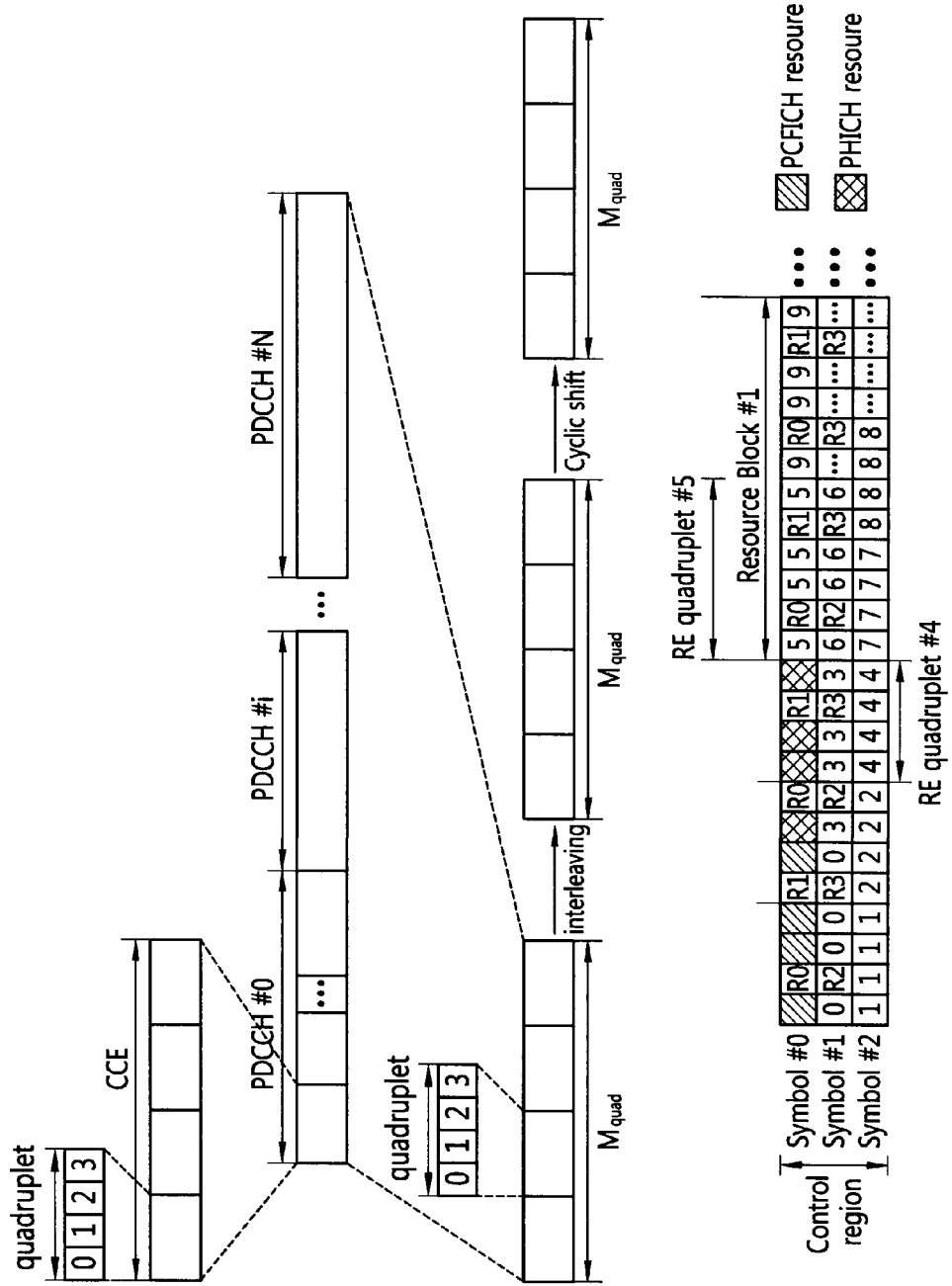
FIG. 5 shows exemplary resource mapping of a physical downlink control channel (PDCCH).

FIG. 5 shows exemplary resource mapping of a PDCCH.

The section 6.8 of 3GPP TS 36.211 V8.5.0 (2008 December) can be incorporated herein by reference. R0 denotes a reference signal of a $1^{st}$ antenna port. R1 denotes a reference signal of a $2^{nd}$ antenna port. R2 denotes a reference signal of a $3^{rd}$ antenna port. R3 denotes a reference signal of a $4^{th}$ antenna port.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruplet in the drawing) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

Figure 6:
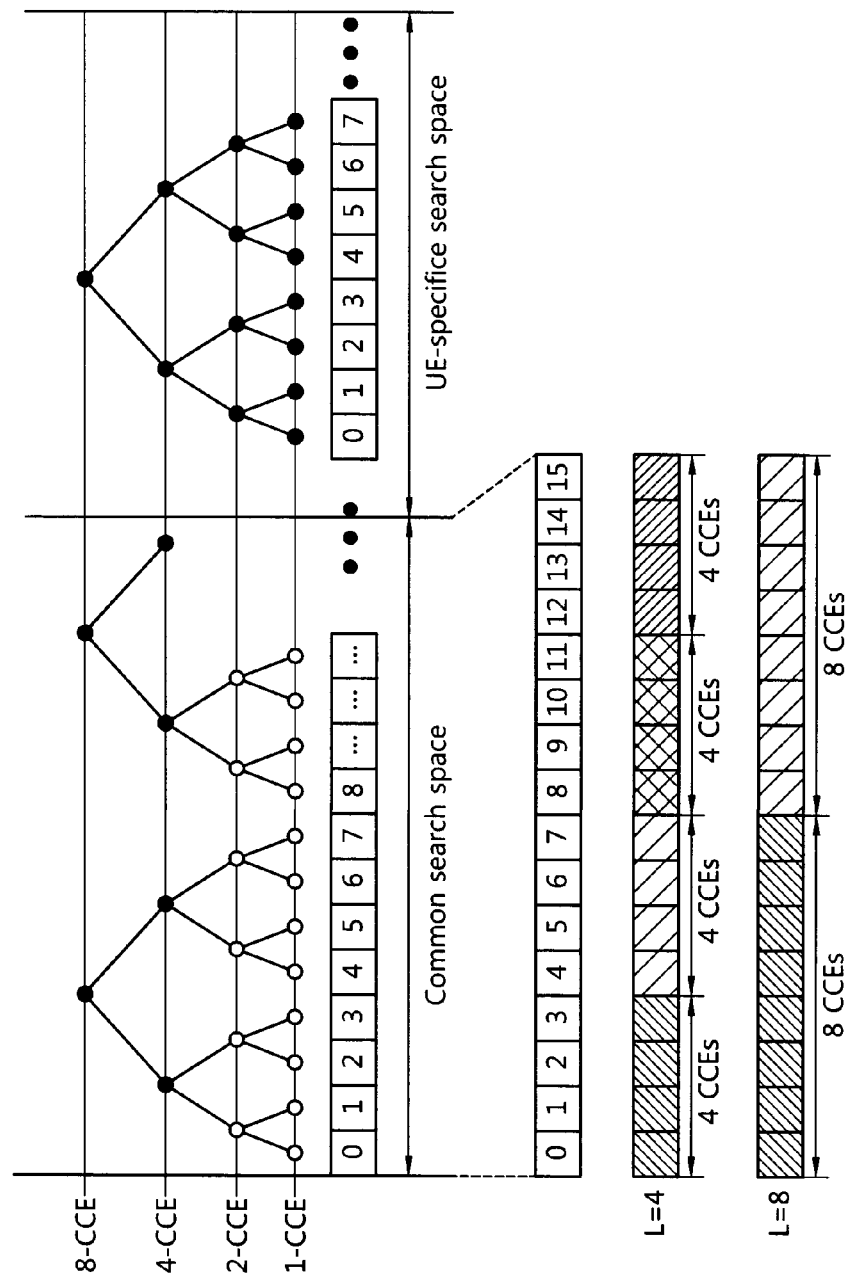
FIG. 6 shows exemplary monitoring of a PDCCH.

FIG. 6 shows exemplary monitoring of a PDCCH. The section 9 of 3GPP TS 36.213 V8.5.0 (2008 December) can be incorporated herein by reference. The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. The UE cannot know about a specific position in a control region in which its PDCCH is transmitted and about a specific CCE aggregation or DCI format used for PDCCH transmission.

A plurality of PDCCHs can be transmitted in one subframe. The UE monitors the plurality of PDCCHs in every subframe. Monitoring is an operation of attempting PDCCH decoding by the UE according to a format of the monitored PDCCH.

The 3GPP LTE uses a search space to reduce an overload caused by blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

The conventional DCI formats transmitted through the PDCCH will be described.

A DCI format includes fields described below, and the respective fields can be mapped to information bits $a_0$ to $a_{A-1}$. The respective fields can be mapped in an order described in the respective DCI formats. Each field may have zero-padding bits. A first field can be mapped to an information bit $a_0$ having a lowest order, and consecutive other fields can be mapped to information bits having higher orders. In each field, a most significant bit (MSB) can be mapped to an information bit having a lowest order of a corresponding field. For example, an MSB of the first field can be mapped to $a_0$. Hereinafter, a set of fields included in the respective conventional DCI formats is called an information field.

1. DCI Format 0

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) a UL index, 9) a DL designation index (only in a TDD), 10) CQI request, etc. If the number of information bits in the DCI format 0 is less than a payload size of the DCI format 1A, '0' is padded so that it is equal to the payload size of the DCI format 1A.

2. DCI Format 1

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed. 2) a resource block designation, 3) a modulation and coding scheme, 4) an HARQ process number, 5) a new data indicator, 6) a redundancy version, 7) a TPC command for a PUCCH, 8) a DL designation index (only in a TDD), etc. If the number of information bits of the DCI format 1 is equal to that of the DCI format 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and has a payload size different from that of the DCI format 0/1A.

3. DCI Format 1A

A DCI format 1A is used for compact scheduling of one PDSCH codeword or a random access process.

Examples of information transmitted in the DCI format 1A are as follows. 1) a flag for identifying the DCI format 0 and the DCI format 1A, 2) a localized/distributed VRB designation flag, 3) a resource block designation, 4) a modulation and coding scheme, 5) an HARQ process number, 6) a new data indicator, 7) a redundancy version, 8) a TPC command for a PUCCH, 9) a DL designation index (only in a TDD), etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI Format 1B

A DCI format 1B includes precoding information and is used for compact scheduling for one PDSCH codeword. Examples of information transmitted in the DCI format 1B are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) transmitted precoding matrix indicator (TPMI) information for precoding, 10) a PMI confirmation for precoding, etc. If the number of information bits in the DCI format 1B is equal to any one of {12, 14, 16, 20, 24, 26, 32, 40, 44, 56}, a bit having one value of '0' is added to the DCI format 1B.

5. DCI Format 1C

A DCI format 1C is used for very compact scheduling for one PDSCH codeword. Examples of information transmitted in the DCI format 1C are as follows.

1) an indicator indicating a gap value, 2) a resource block designation, 3) a transport block size index, etc.

6. DCI Format 1D

A DCI format 1D includes precoding and power offset information and is used for compact scheduling for one PDSCH codeword.

Examples of information transmitted in the DCI format 1D are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) TPMI information for precoding, 10) a DL power offset, etc. If the number of information bits in the DCI format 1D is equal to any one of {12, 14, 16, 20, 24, 26, 32, 40, 44, 56}, a bit having one value of '0' is added to the DCI format 1D.

7. DCI Format 2

A DCI format 2 is used to designate a PDSCH for a close-loop MIMO operation. Examples of information transmitted in the DCI format 2 are as follows.

1) a resource allocation header, 2) a resource block designation, 3) a TPC command for a PUCCH, 4) a DL designation index (only in a TDD), 5) an HARQ process number, 6) a transport block to codeword swap flag, 7) a modulation and coding scheme, 8) a new data indicator, 9) a redundancy version, 10) precoding information, etc.

8. DCI Format 2A

A DCI format 2A is used to designate a PDSCH for an open-loop MIMO operation. Examples of information transmitted in the DCI format 2A are as follows.

1) a resource allocation header, 2) a TPC command for a PUCCH, 3) a DL designation index (only in a TDD), 4) an HARQ process number, 5) a transport block to codeword swap flag, 6) a modulation and coding scheme, 7) a new data indicator, 8) a redundancy version, 9) precoding information, etc.

9. DCI Format 3

A DCI format 3 is used to transmit a TPC command for a PUCCH and a PUSCH through 2-bit power regulation. Examples of information transmitted in the DCI format 3 are as follows.

1) N transmit power control (TPC) commands. Herein, N is determined by Equation 1 below.

$$N = \left\lfloor \frac{L_{format0}}{2} \right\rfloor \quad \text{[Equation 1]}$$

Herein, $L_{format0}$ is equal to a payload size of a DCI format 0 before CRC is attached. If floor($L_{format0}$/2) is less than $L_{format0}$/2, one bit having a value of '0' is added.

10. DCI Format 3A

A DCI format 3A is used to transmit a TPC command for a PUCCH and a PUSCH through 1-bit power regulation. Examples of information transmitted in the DCI format 3A are as follows.

1) M TPC commands. Herein, M is $L_{format0}$ and is equal to a payload size of a DCI format 0 before CRC is attached.

The section 5.3.3.1 of 3GPP TS 36.212 V8.7.0 (2009 May) can be incorporated herein to describe the DCI formats.

A DL transmission mode between a BS and a UE can be classified into 7 modes as follows.

1. A single antenna port: Precoding is not performed in this mode.

2. Transmit diversity: Transmit diversity can be used in 2 or 4 antenna ports using SFBC.

3. Open-loop spatial multiplexing: This is an open-loop mode in which rank adaptation based on RI feedback is possible. The transmit diversity is applicable when a rank is 1. A great delay CDD can be used when the rank is greater than 1.

4. Closed-loop spatial multiplexing: This is a mode in which precoding feedback supporting dynamic rank adaptation is applied.

5. Multi-user MIMO

6. Closed-loop rank-1 precoding

7. Single-antenna port: This is a mode that can be used for beamforming when a UE-specific reference signal is used.

Table 1 below shows an example of a DCI format to be monitored by a UE according to the aforementioned DL transmission mode.

TABLE 1

| Transmission mode | DCI format to be monitored |
| --- | --- |
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

Table 2 below shows an example of the number of blind decoding attempts of the UE.

TABLE 2

| Search Space Type | Aggregation level L | Size [In CCEs] | Number of PDCCH candidates | DCI formats | # of blind decodings |
| --- | --- | --- | --- | --- | --- |
| UE-specific | 1 | 6 | 6 | 0, 1, 1A, 1B, 1D, 2, 2A | (6 + 6 + 2 + 2) * 2 = 32 |
| | 2 | 12 | 6 | | |
| | 4 | 8 | 2 | | |
| | 8 | 16 | 2 | | |
| Common | 4 | 16 | 4 | 0, 1A, 1C, 3/3A | (4 + 2) * 2 = 12 |
| | 8 | 16 | 2 | | |

As shown in Table 2, the UE may have to perform up to 44 blind decoding attempts. The UE receives information regarding a bandwidth of a carrier, a transmission mode, the number of antenna ports, etc., through system information from the BS, and thus can know in advance a payload size of a PDCCH to be detected when performing blind decoding. The UE performs 44 blind decoding attempts in total, i.e., 32 (i.e., 16×2=32) attempts in a UE-specific search space and 12 (i.e., 6×2=12) attempts in a common search space, for each of a DL and a UL with respect to the pre-known payload size of the PDCCH.

Figure 7:
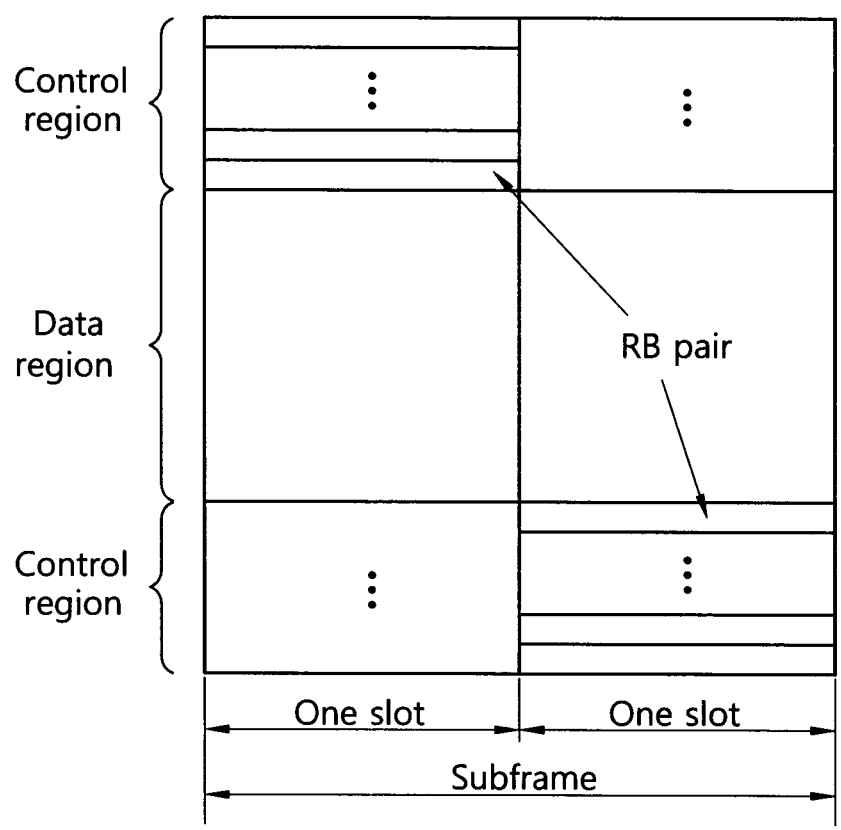
FIG. 7 shows a structure of an uplink (UL) subframe.

FIG. 7 shows a structure of a UL subframe.

The UL subframe can be divided into a control region and a data region in a frequency domain. A physical uplink control channel (PUCCH) for transmitting UL control information is allocated to the control region. A physical uplink shared channel (PUSCH) for transmitting data is allocated to the data region. To maintain a single-carrier property, a UE does not simultaneously transmit the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. Since the UE transmits UL control information over time through different subcarriers, a frequency diversity gain can be obtained.

Examples of UL control information transmitted on the PUCCH include hybrid automatic repeat request (HARQ) acknowledgement (ACK)/non-acknowledgment (NACK), a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing a transport block for the UL-SCH and control information. Examples of the control information multiplexed to the data may include a CQI, a precoding matrix indicator (PMI), HARQ, a rank indicator (RI), etc. Alternatively, the UL data may consist of only control information.

In the LTE-A system, an SC-FDMA transmission scheme is applied in a UL. SC-FDMA is a transmission scheme in which IFFT is performed after DFT spreading is performed. The SC-FDMA is also called DFT-spread OFDM (DFT-s OFDM). A peak-to-average power ratio (PAPR) or a cubic metric (CM) can decrease in the SC-FDMA. When using the SC-FDMA transmission scheme, a non-linear distortion duration of a power amplifier can be avoided and thus transmit power efficiency can increase in a UE in which power consumption is limited. Accordingly, a user throughput can increase.

Meanwhile, a 3GPP LTE-A system supports a carrier aggregation system. 3GPP TR 36.815 V9.0.0 (2010 March) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous component carriers (CCs) and non-contiguous CCs are included.

In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system. A carrier (i.e., component carrier) may correspond to each cell.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in a UL is equal to the number of carriers used in a DL, it is necessary to configure such that all CCs are compatible with the LTE Rel-8 system.

In order to efficiently use a plurality of carriers, the plurality of carriers can be managed by media access control (MAC).

Figure 8:
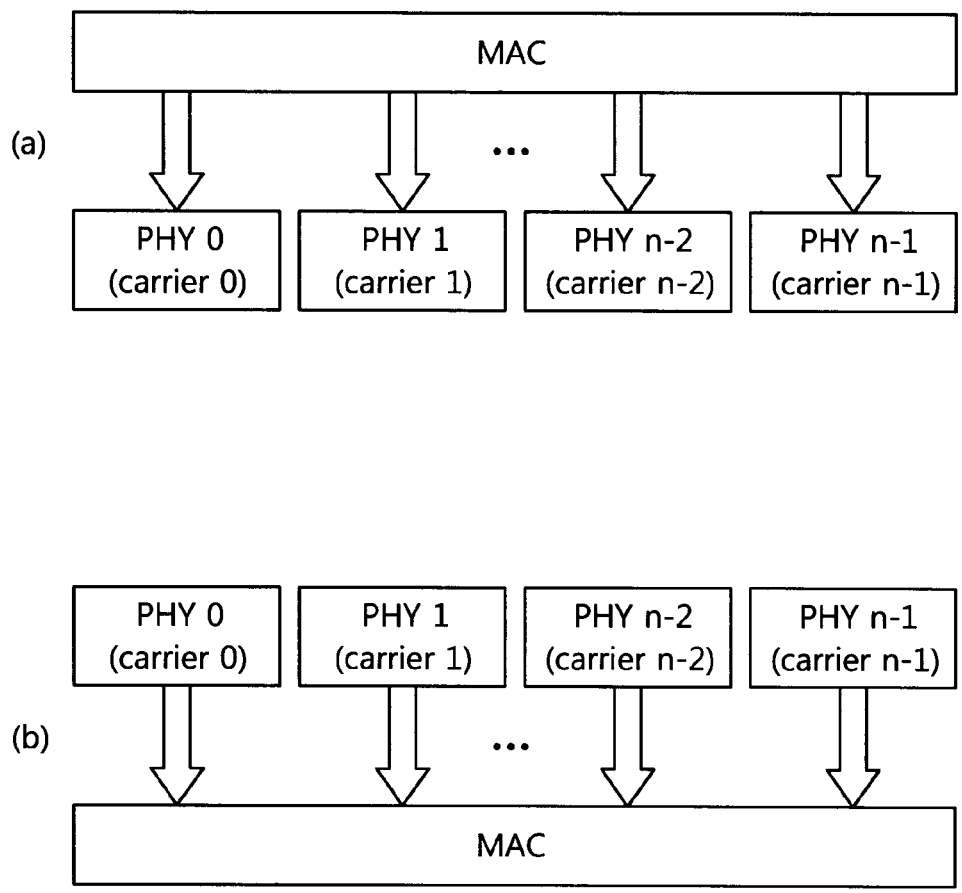
FIG. 8 shows an example of a base station (BS) and a user equipment (UE) which constitute a carrier aggregation system.

FIG. 8 shows an example of a BS and a UE which constitute a carrier aggregation system.

In the BS of FIG. 8(a), one MAC transmits and receives data by managing and operating all of n carriers. This is also applied to the UE of FIG. 8(b). From the perspective of the UE, one transport block and one HARQ entity may exist per CC. The UE can be scheduled simultaneously for a plurality of carriers. The carrier aggregation system of FIG. 8 can apply both to a contiguous carrier aggregation system and a non-contiguous carrier aggregation system. The respective carriers managed by one MAC do not have to be contiguous to each other, which results in flexibility in terms of resource management.

Figure 9:
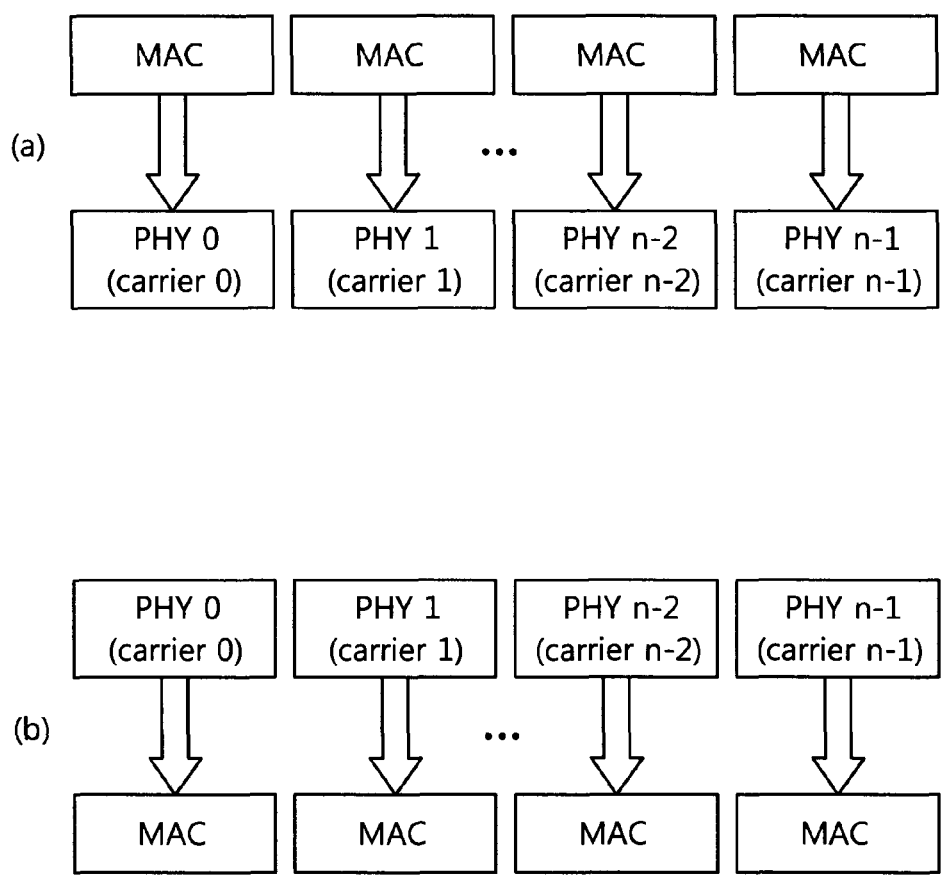
FIG. 9 and FIG. 10 show other examples of a BS and a UE which constitute a carrier aggregation system.
Figure 10:
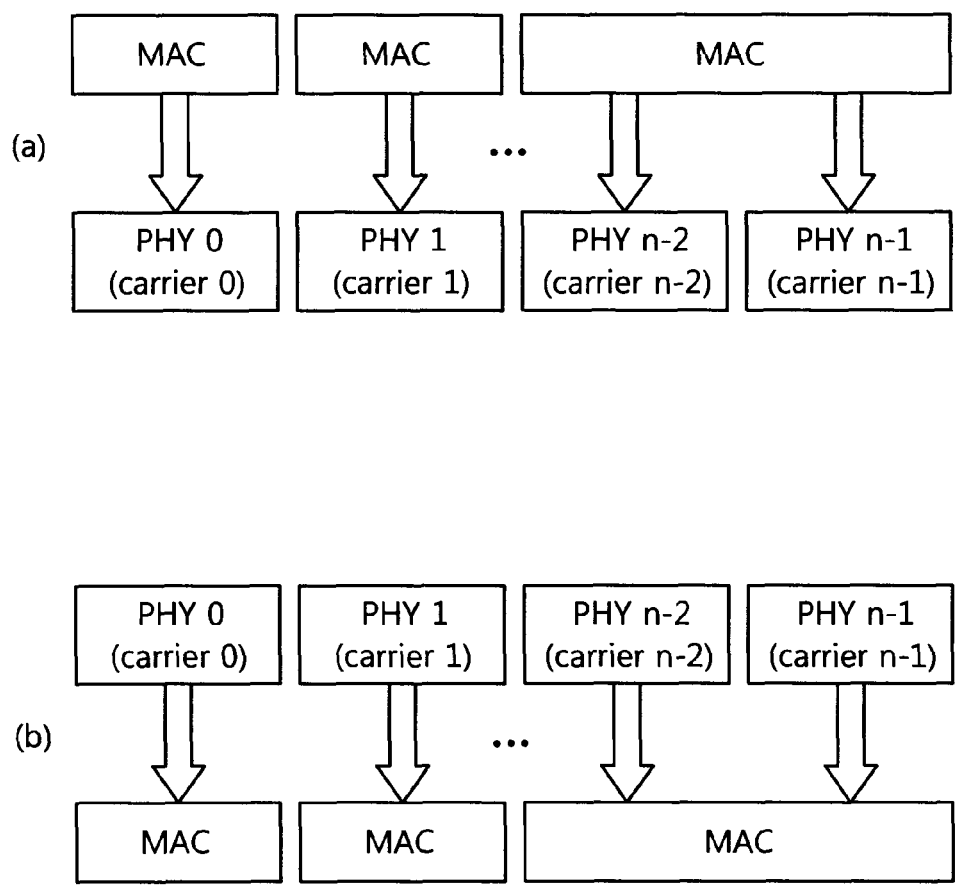

FIG. 9 and FIG. 10 show other examples of a BS and a UE which constitute a carrier aggregation system.

In the BS of FIG. 9(a) and the UE of FIG. 9(b), one MAC manages only one carrier. That is, the MAC and the carrier are 1:1 mapped. In the BS of FIG. 10(a) and the UE of FIG. 10(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 8 to FIG. 10 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, a plurality of carriers can be used by dividing them for a UL and a DL. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

Hereinafter, each carrier that can be used to configure a broadband carrier in a multi-carrier system (or a carrier aggregation system) is called a component carrier (CC). For backward compatibility with the legacy system, the CC can directly use a bandwidth used in the legacy system. For example, the 3GPP LTE system supports bandwidths of 1.4 MHz, 3 MHz, 5 MHz, 10 MHz, 15 MHz, and 20 MHz. Therefore, in the 3GPP LTE-A system, each CC can have any one of the bandwidths of 1.4 MHz, 3 MHz, 5 MHz, 10 MHz, 15 MHz, and 20 MHz, and a plurality of CCs can be aggregated when configuring a broadband equal to or greater than 20 MHz. Hereinafter, for convenience of explanation, a CC used for an uplink can be simply referred to as an uplink component carrier (UL CC), and a CC used for a downlink can be simply referred to as a downlink component carrier (DL CC).

Figure 11:
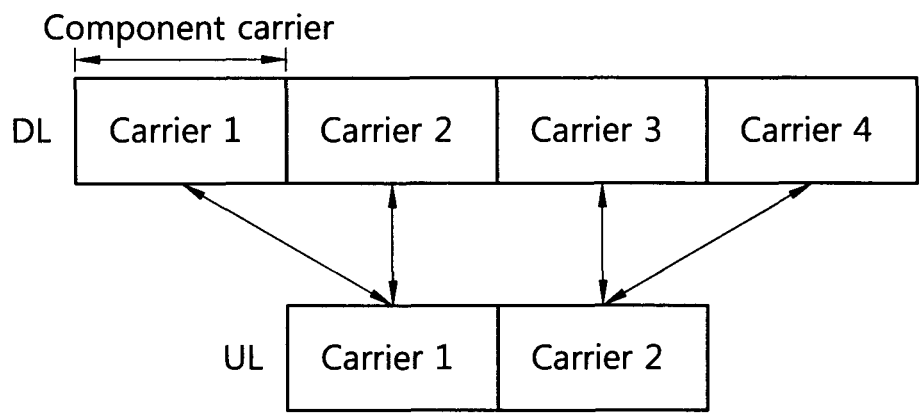
FIG. 11 is an example of a DL/UL asymmetric carrier aggregation system to which the present invention is applicable.
Figure 11:
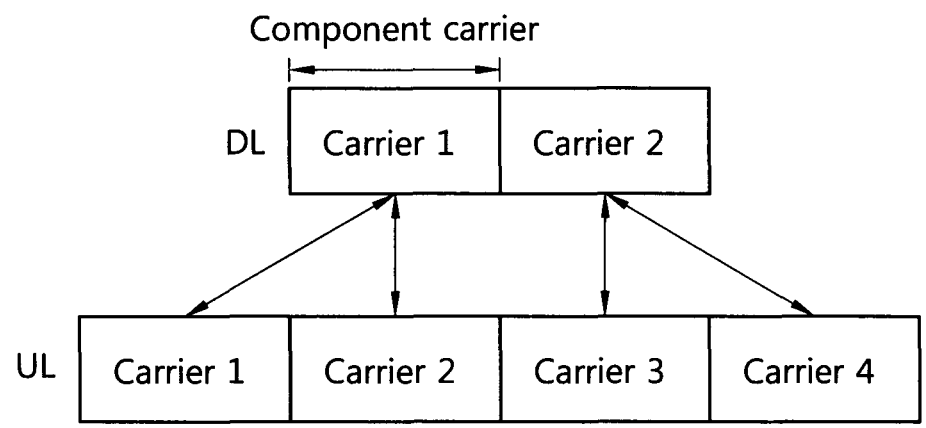

FIG. 11 is an example of a DL/UL asymmetric carrier aggregation system to which the present invention is applicable.

FIG. 11(a) shows a case where the number of DL CCs is greater than the number of UL CCs, and FIG. 11(b) shows a case where the number of UL CCs is greater than the number of DL CCs. Although FIG. 11(a) shows a case where two DL CCs are linked to one UL CC and FIG. 11(b) shows a case where one DL CC is linked to two UL CCs, the number of CCs constituting a DL and a UL and a linkage ratio of the DL CC and the UL CC can change variously according to a carrier aggregation system to which the present invention is applied, and the content proposed in the present invention can also apply to a symmetric carrier aggregation system in which a CC constituting the DL and a CC constituting the UL are 1:1 linked.

A carrier having backward compatibility in the LTE-A system is accessible by the conventional UE by considering compatibility with UEs of the conventional 3GPP LTE system, and can function as independent one carrier or as a part of carrier aggregation. The carrier having backward compatibility is always configured in a pair form of the DL and the UL in an FDD system. For this, a carrier not having backward compatibility is not accessible to the conventional UE since the carrier is newly defined without considering compatibility with UEs operating in the conventional LTE system.

In a carrier aggregation system, a cell-specific or/and UE-specific method can be taken into account as a form of using one or a plurality of carriers. In the following description of the present invention, the cell-specific method implies a carrier configuration from the perspective of any cell or BS and the UE-specific method implies a carrier configuration from the perspective of a UE.

The cell-specific carrier aggregation may have a form of carrier aggregation configured by any BS or cell. In case of an FDD system, a form of the cell-specific carrier aggregation may be a form in which a DL and UL linkage is determined according to a Tx-Rx separation specified in 3GPP LTE release-8/LTE-A. For example, a carrier frequency in the UL and the DL can be designated by an E-UTRA absolute radio frequency channel number (EARFCN) in the range 0 to 65535. The EARFCN and a carrier frequency in MHz unit for the DL may have a relation given by Equation 2 below.

$$F_{DL} = F_{DL\_low} + 0.1(N_{DL} - N_{Offs-DL})$$ [Equation 2]

In Equation 2 above, $N_{DL}$ is a DL EARFCN, and $F_{DL\_low}$ and $N_{Offs-DL}$ are given by Table 3 below.

TABLE 3

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

NOTE:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

An E-UTRA transmission channel (carrier centre frequency) to reception channel (carrier centre frequency) separation based on transmission and reception channel bandwidths can be defined by Table 4 below.

TABLE 4

| Frequency Band | TX-RX carrier centre frequency separation |
|---|---|
| 1 | 190 MHz |
| 2 | 80 MHz. |
| 3 | 95 MHz. |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |

TABLE 4-continued

| Frequency Band | TX-RX carrier centre frequency separation |
|---|---|
| 12 | 30 MHz |
| 13 | −31 MHz |
| 14 | −30 MHz |
| 17 | 30 MHz |

For details related to the above description, the section 5.7 of 3GPP TS 36.101 V8.4.0 released in December, 2008 can be incorporated by reference.

In the carrier aggregation system, a PDCCH monitoring DL CC set (hereinafter, simply referred to as a monitoring DL CC set) implies a set of DL CCs for monitoring a PDCCH, that is, a control channel for transmitting control information by a specific UE. The PDCCH monitoring DL CC set can be configured in a UE-specific or cell-specific manner.

Cross-carrier scheduling is a scheduling method capable of performing resource allocation of a PDSCH transmitted by using a different carrier through a PDCCH transmitted by using a specific CC and/or resource allocation of a PUSCH transmitted by using another CC other than a CC basically linked to the specific CC. That is, the PDCCH and the PDSCH can be transmitted on different DL CCs, and the PUSCH can be transmitted on a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which PDCCH provides control information. A field including the carrier indicator is hereinafter called a carrier indication field (CIF).

When the cross-carrier scheduling is activated, the number of blind decoding attempts can be determined according to whether a link relation is established between a monitoring DL CC and a scheduled DL CC. Herein, the scheduled DL CC implies a DL CC which is scheduled by DCI transmitted on a monitoring DL CC.

Figure 12:
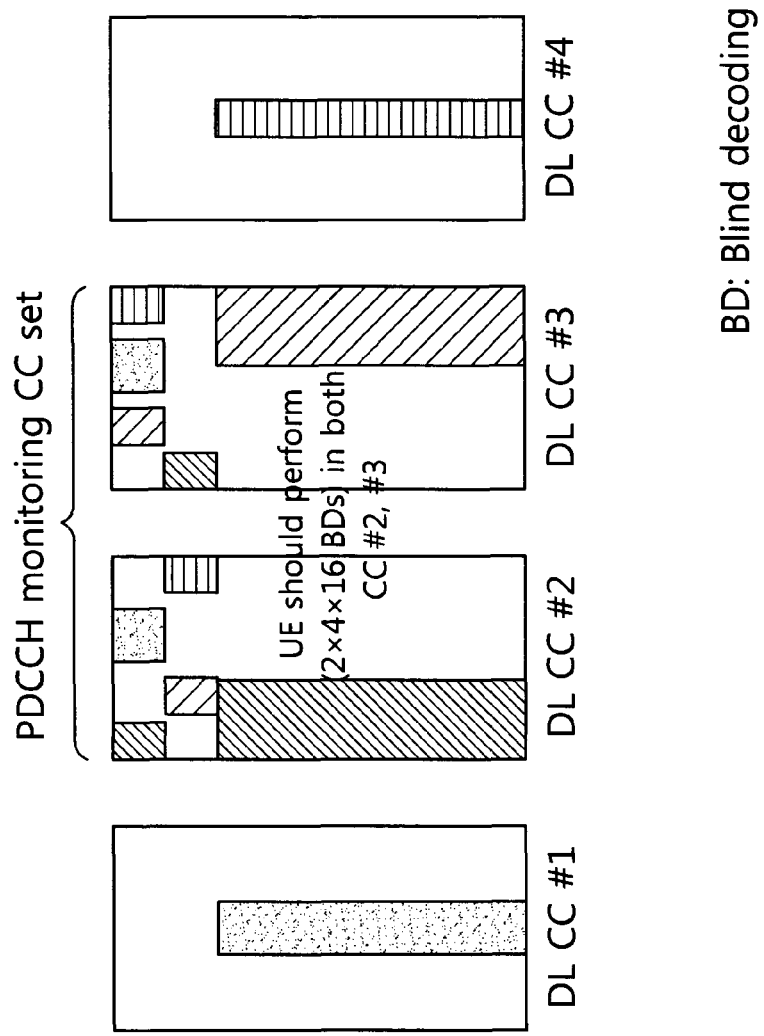
FIG. 12 shows a case where there is no link relation between a monitoring DL component carrier (CC) and a scheduled DL CC.

FIG. 12 shows a case where there is no link relation between a monitoring DL CC and a scheduled DL CC.

Referring to FIG. 12, a monitoring DL CC set includes a DL CC#2 and a CL CC#3, and a scheduled DL CC includes a DL CC#1 to a DL CC#4. If there is no link relation between the monitoring DL CC and the scheduled DL CC, a UE must perform blind decoding to detect a PDCCH for all scheduled DL CCs in each monitoring DL CC. That is, the UE attempts PDCCH detection for the DL CC#1, DL CC#2, DL CC#3, and DL CC#4 in a control region of the DL CC#2, and also attempts PDCCH detection for the DL CC#1 to the DL CC#4 in a control region of the DL CC#3. Therefore, the total number of blind decoding attempts to be performed by the UE to detect DL-related DCI in a UE specific search space is 2×4×16=128.

Figure 13:
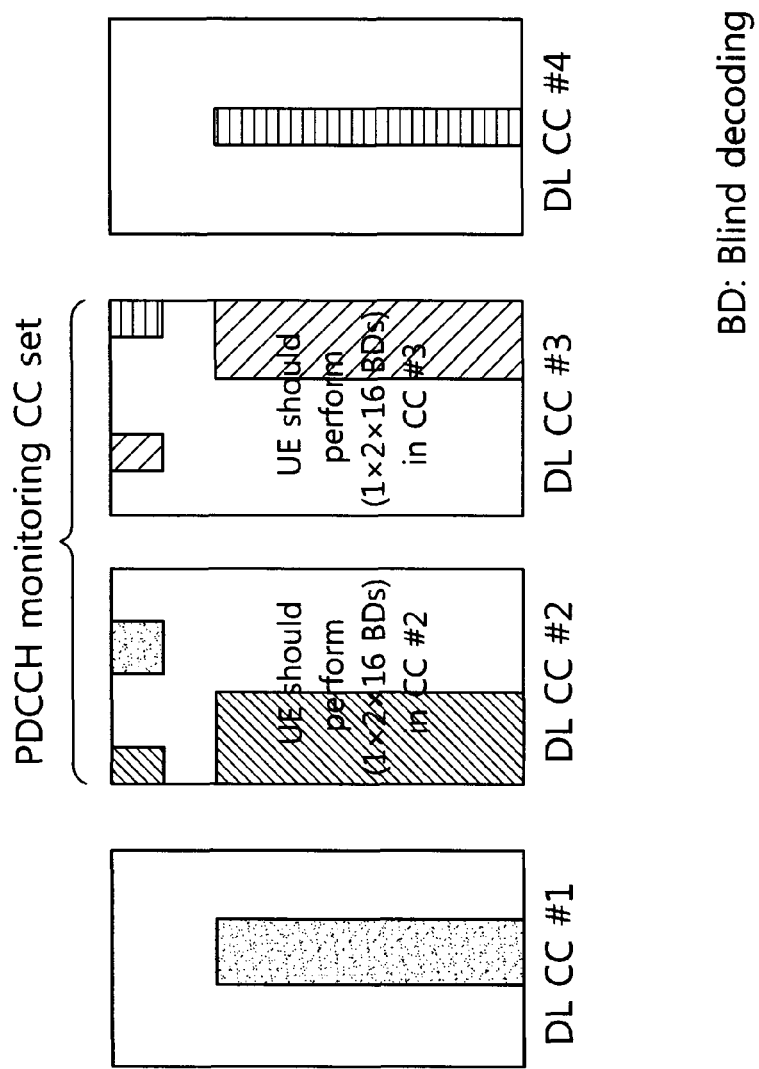
FIG. 13 shows a case where there is a link relation between a monitoring DL CC and a scheduled DL CC.

FIG. 13 shows a case where there is a link relation between a monitoring DL CC and a scheduled DL CC.

Referring to FIG. 13, a monitoring DL CC set includes a DL CC#2 and a DL CC#3, and a scheduled DL CC includes a DL CC#1 to a DL CC#4. In this case, there is a link relation in which a PDCCH for the DL CC#1 and the DL CC#2 can be transmitted in a control region of the DL CC#2, and a PDCCH for the DL CC#3 and the DL CC#4 can be transmitted in a control region of the DL CC#3. Such a link relation can be predetermined between a UE and a BS, or can be reported to the UE through a higher layer signal such as RRC.

As such, when the link relation exists between the monitoring DL CC and the scheduled DL CC, the number of blind decoding attempts to be performed by the UE is decreased. For example, considering the number of blind decoding attempts to be performed by the UE to detected the DL-related DCI in a UE-specific search space, since the UE knows that only the PDCCH for the DL CC#1 and the DL CC#2 can be transmitted in the region of the DL CC#2, the number of blind decoding attempts to be performed is only 1×2×16=32. In addition, since the UE knows that only the PDCCH for the DL CC#3 and the DL CC#4 can be transmitted in the control region of the DL CC#3, the number of blind decoding attempts to be performed is only 1×2×16=32. Therefore, the total number of blind decoding attempts to be performed by the UE is 64. That is, the number of blind decoding attempts can be significantly decreased in comparison with the number of blind decoding attempts (i.e., 128 blind decoding attempts) described above with reference to FIG. 10. As such, if the link relation exists between the monitoring DL CC and the scheduled CC, there is an advantage in that the number of blind decoding attempts to be performed by the UE is significantly decreased.

Hereinafter, a method of reconfiguring a CIF field in a multi-carrier system will be described.

In the conventional LTE Rel-8, a UE has only one RRC connection with respect to a network. One carrier (also referred to as one cell) provides security input information, e.g., one evolved cell global identifier (ECGI), one physical cell identifier (PCI), one absolute radio frequency channel number (ARFCN), etc. That is, UEs in respective connection modes use only one carrier.

On the other hand, a plurality of CCs can be allocated to an LTE-A UE, and the CC can be reconfigured such as CC addition, deletion, etc. Such a CC reconfiguration is performed through an RRCConnectionReconfiguration message after establishing an RRC connection for a specific CC (also referred to as a special cell) between the UE and a BS (or network). In the CC addition or deletion process, a specific CC may be maintained without change. For example, when a DL CC#1 and a DL CC#2 are allocated to a specific UE, the DL CC#1 can be maintained without being deleted in the CC reconfiguration process.

Figure 14:
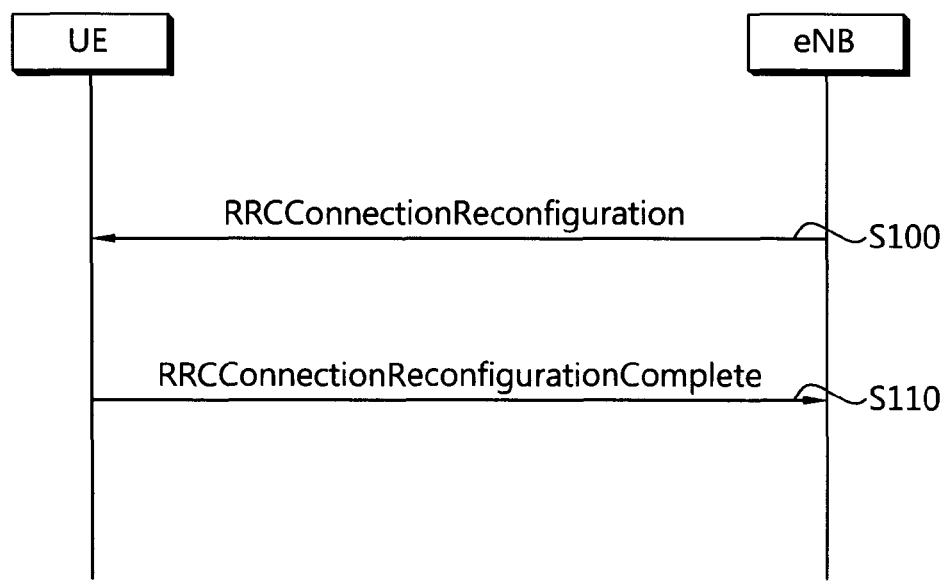
FIG. 14 shows a process of reconfiguring a radio resource control (RRC) connection between a UE and a BS.

FIG. 14 shows a process of reconfiguring an RRC connection between a UE and a BS.

Referring to FIG. 14, the BS transmits an RRCConnectionReconfiguration message to the UE (step S100). The RRCConnectionReconfiguration message may include information indicating whether DCI includes a CIF, that is, information indicating whether to activate the CIF. This information may be UE-specific information.

When the reconfiguration based on the RRCConnectionReconfiguration message is confirmed, the UE transmits an RRCConnectionReconfigurationComplete message to the BS (step S110). By receiving the RRCConnectionReconfigurationComplete message, the BS can know that the UE has successfully performed the reconfiguration. For example, while allocating only one DL CC to the UE (configuration 1), the UE can allocate a plurality of DL CCs due to a reason such as an increase in an amount of transmission data, a deterioration of a channel state, or the like (configuration 2). In this case, the DCI can be transmitted without the CIF in the configuration, and can be transmitted with the CIF in the configuration 2.

After the BS receives the RRCConnectionReconfigurationComplete message from the UE, it can be known that the UE will perform blind decoding on the DCI including the CIF.

However, the RRC connection reconfiguration process may have an ambiguity problem.

Figure 15:
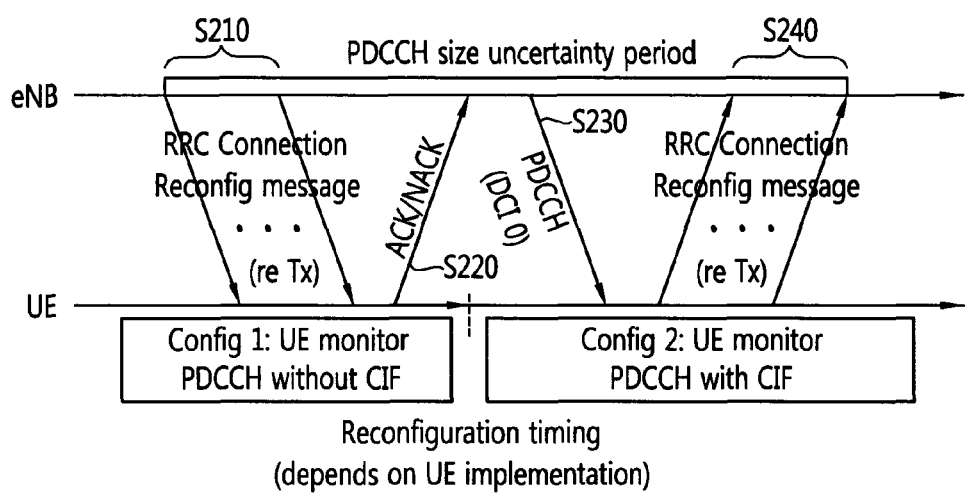
FIG. 15 shows an ambiguity problem which may occur in an RRC connection reconfiguration process.

FIG. 15 shows an ambiguity problem which may occur in an RRC connection reconfiguration process.

When transmitting downlink control information (DCI), a BS may transmit DCI including a CIF while transmitting DCI not including the CIF. That is, it may be reconfigured from a configuration in which cross-carrier scheduling is not performed to a configuration in which cross-carrier scheduling is performed. For example, in a situation where one DL CC and one UL CC linked to the DL CC are allocated to a specific UE, there may be a case where a plurality of DL CCs and at least one UL CC linked to the respective DL CCs are allocated to the specific UE. In this case, the BS may transmit DCI including a CIF while transmitting DCI not including the CIF.

Referring to FIG. 15, the BS can report that DCI is reconfigured by transmitting (or retransmitting if necessary) an RRCConnectionReconfiguration message (step S210). For example, it can be reported that the DCI is reconfigured from a configuration 1 for transmitting DCI not including a CIF to a configuration 2 for transmitting DCI including the CIF.

After receiving the RRCConnectionReconfiguration message, the UE can transmit an ACK/NACK signal according to whether decoding is successful (step S220), and can perform blind decoding by assuming the DCI not including the CIF starting from a specific time.

When it is assumed that the UE transmits ACK, the BS transmits a DCI format 0 including the CIF through a PDCCH (step S230). If the UE successfully decodes the DCI format 0 including the CIF, the UE transmits (or retransmits if necessary) an RRCConnectionReconfigurationComplete message to the BS (step S240).

However, the aforementioned process has a problem in that a time at which the UE applies the reconfiguration is ambiguous. For example, in a case where the UE transmits NACK when the UE receives the RRCConnectionReconfiguration message but fails in decoding thereof, the BS may erroneously receive ACK due to a reason of an unstable channel state or the like. In this case, if the BS transmits DCI including a CIF, the DCI cannot be properly decoded since the UE monitors DCI not including the CIF. The same problem also occurs when the UE transmits ACK but it is erroneously received as NACK.

That is, the aforementioned process has a problem in that whether the UE monitors the DCI including the CIF or monitors the DCI not including the CIF cannot be correctly known until the BS receives the RRCConnectionReconfigurationComplete message from the UE. In other words, there is a problem in that a specific time at which the BS transmits the DCI including the CIF is uncertain. In FIG. 15, such a time period is indicated by a PDCCH size uncertainty period. The PDCCH size uncertainty period may be a period from a subframe in which the BS transmits the RRCConnectionReconfiguration message to a subframe in which the BS receives the RRCConnectionReconfigurationComplete from the UE.

A method for solving the aforementioned problem will be described below.

1. A method of performing signaling through two types of DCI used before and after reconfiguring a UL grant for an RRCConnectionReconfigurationComplete message.

Figure 16:
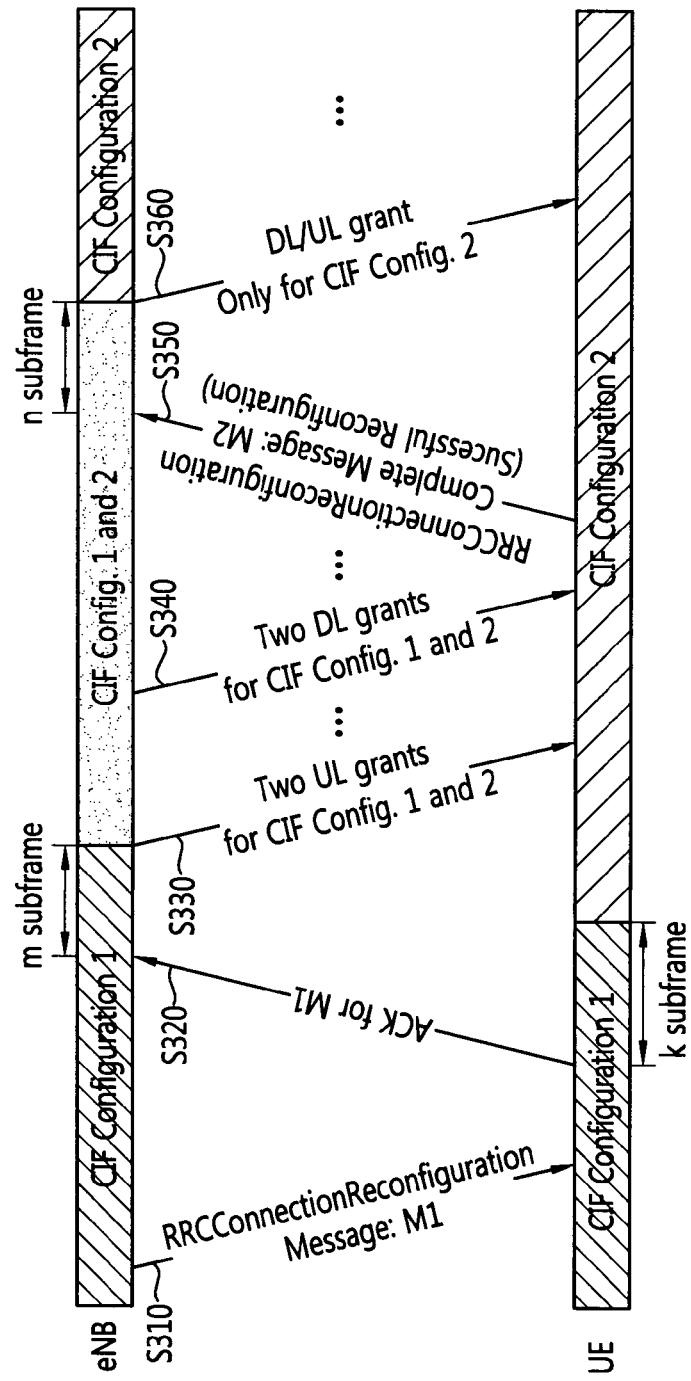
FIG. 16 shows an example of a signaling process between a BS and a UE in case of reconfiguring a carrier indication field (CIF).

FIG. 16 shows an example of a signaling process between a BS and a UE in case of reconfiguring a CIF.

Referring to FIG. 16, the BS can reconfigure the CIF from a configuration 1 to a configuration 2. For example, the CIF configuration 1 may be a case where DCI does not include the CIF, and the CIF configuration 2 may be a case where the DCI includes the CIF. The DCIs transmitted before/after the reconfiguration may have a different payload size due to a CIF field. If the CIF field consists of 3 bits, the payload size of the DCI including the CIF may be increased by 3 bits.

The BS transmits an RRCConnectionReconfiguration message (hereinafter, simply referred to as an M1 message) to the UE (step S310). If the M1 message is successfully decoded, the UE transmits an ACK signal to the BS (step S320). The UE performs blind decoding on the DCI by applying the CIF configuration 2 at k subframes (e.g., 4 subframes) later from a subframe in which the ACK signal is transmitted.

The BS transmits DCIs used before and after the reconfiguration at m subframes (e.g., four subframes) later from the subframe in which the ACK is received (steps S330 and S340). That is, the BS transmits two types of DCI, e.g., DCI based on the CIF configuration 1 and DCI based on the CIF configuration 2. The two types of DCI include a UL grant, i.e., a DCI format 0 required when the UE transmits the RRCConnectionReconfigurationComplete message to the BS.

The reason of transmitting by the BS the two types of DCI used before and after the reconfiguration is because a time at which the UE performs reconfiguration is ambiguous and because there is a possibility of an error of an ACK/NACK signal. Since the BS transmits the two types of DCI used before and after the reconfiguration, the UE can properly decode the DCI transmitted by the BS irrespective of whether the UE performs blind decoding on the DCI used before the reconfiguration or blind decoding on the DCI used after the reconfiguration.

Since ACK is transmitted in response to the M1 message, the UE decodes the DCI on the basis of the CIF configuration 2. According to resource allocation information included in the decoded DCI (i.e., a DCI format 0 including a CIF), the UE transmits an RRCConnectionReconfigurationComplete message to the BS (step S350). The RRCConnectionReconfigurationComplete message includes information indicating that the reconfiguration is successfully performed.

The BS applies the reconfigured CIF at n subframes (e.g., 4 subframes) later from a subframe in which the RRCConnectionReconfigurationComplete message is received (step S360). That is, the BS transmits only DCI based on the CIF configuration 2.

Figure 17:
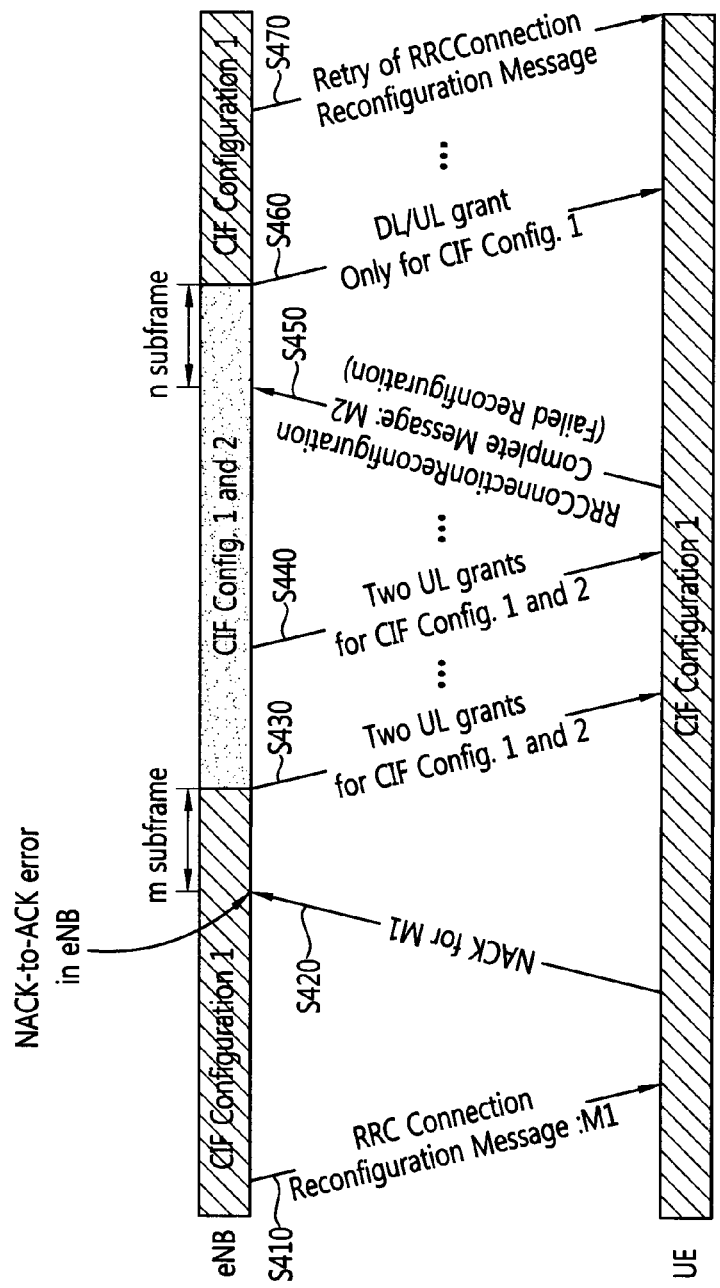
FIG. 17 is another example of a signaling process between a BS and a UE in case of reconfiguring a CIF.

FIG. 17 is another example of a signaling process between a BS and a UE in case of reconfiguring a CIF.

Referring to FIG. 17, in order to reconfigure the CIF from a CIF configuration 1 to a CIF configuration 2, the BS transmits an RRCConnectionReconfiguration message (i.e., M1 message) to the UE (step S410). If decoding of the M1 message fails, the UE transmits a NACK signal to the BS (step S420). In this case, the BS may incorrectly recognize NACK as ACK due to an error caused by various reasons.

The BS transmits DCIs used before and after the reconfiguration at m subframes (e.g., four subframes) later from a subframe in which the ACK (or NACK) is received (steps S430 and S440). That is, the BS transmits two types of DCI, e.g., DCI based on the CIF configuration 1 and DCI based on the CIF configuration 2. The two types of DCI include a UL grant, i.e., a DCI format 0 required when the UE transmits the RRCConnectionReconfigurationComplete message to the BS.

Since NACK is transmitted in response to the M1 message, the UE decodes the DCI according to the CIF configuration 1. The UE performs blind decoding by assuming a payload size of the DCI according to the CIF configuration applied before the CIF reconfiguration, that is, according to the CIF configuration 1. Therefore, the UE can decode a UL grant included in the DCI without the increase in the number of additional blind decoding attempts. According to resource allocation information included in the decoded DCI (i.e., a DCI format 0 not including a CIF), the UE transmits an RRCConnectionReconfigurationComplete message to the BS (step S450). In this case, the RRCConnectionReconfigurationComplete message includes information indicating that the CIF is not reconfigured.

The BS transmits DCI based on the CIF configuration 1 at n subframes (e.g., 4 subframes) later from a subframe in which the RRCConnectionReconfigurationComplete message is received (step S460). The BS retransmits the RRCConnectionReconfiguration message to the UE (step S470). That is, by using the RRC connection reconfiguration completion message, the BS can know that the UE fails to reconfigure the CIF. Therefore, the CIF reconfiguration is attempted again by transmitting the RRCConnectionReconfiguration message.

2. A transmission method in which specific DCI is transmitted by using only a predetermined CIF format.

When reconfiguring a CIF, in a signaling process of a message indicating a CIF reconfiguration (e.g., an RRCConnectionReconfiguration message) and a message for reporting completion of the CIF reconfiguration (e.g., an RRCConnectionReconfigurationComplete message), an ambiguity occurs between a BS and a UE because there is a possibility that the UE may not be able to correctly decode DCI including resource allocation required to transmit/receive these messages.

In order to avoid the occurrence of ambiguity, DCI for non-cross carrier scheduling can be transmitted in a format not including a CIF in any CC or a specific CC in which a PDCCH is transmitted. That is, it can be determined such that the DCI is transmitted only in a predetermined specific format.

For example, in a specific DL CC in which the PDCCH is transmitted, DCI for PDSCH scheduling transmitted in the specific DL CC or DCI for PUSCH scheduling transmitted by the UE in a UL CC linked to the specific DL CC can be predetermined such that the DCI is transmitted only in a format not including the CIF. Then, the BS transmits a message for indicating a CIF reconfiguration by using a resource indicated by DCI not including a CIF in the specific CC (e.g., a DCI format 1A), and the UE transmits a message for indicating completion of the CIF reconfiguration by using a radio resource indicated through a DCI having a format not including a CIF in the specific CC (e.g., a DCI format 0), thereby being able to prevent the occurrence of ambiguity.

When the DCI for non-cross scheduling is transmitted in the format not including the CIF in the specific DL CC, there is a need to specify a search space in which the DCI is transmitted.

Figure 18:
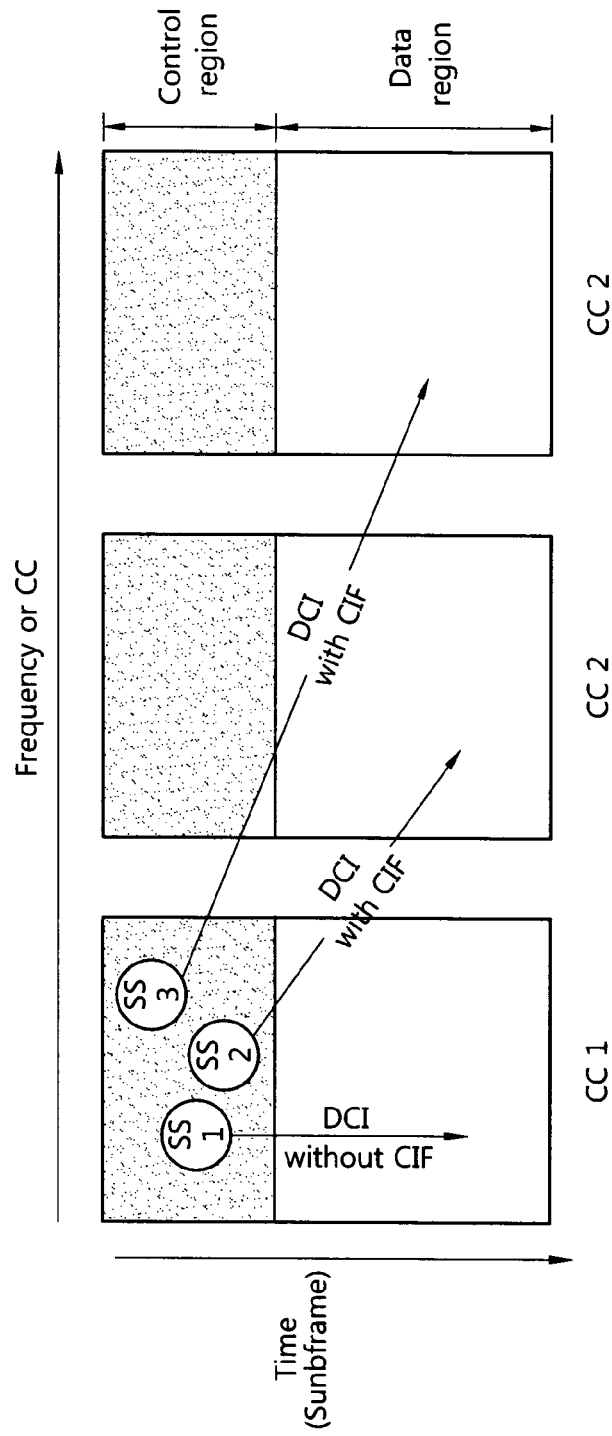
FIG. 18 shows an example of a search space in which downlink control information (DCI) for non-cross-carrier scheduling is transmitted and a search space in which DCI for cross-carrier scheduling is transmitted.

FIG. 18 shows an example of a search space in which DCI for non-cross-carrier scheduling is transmitted and a search space in which DCI for cross-carrier scheduling is transmitted.

Referring to FIG. 18, a control region of a CC 1 (i.e., DL CC 1) includes a plurality of search spaces. The CC 1 may include a plurality of search spaces such as a search space 1 (SS 1), a search space 2 (SS 2), and a search space 3 (SS 3). The CC 1 may be a CC in which an initial connection establishment process is performed with a BS, a connection re-establishment process is performed with the BS, or a handover process is performed.

In the SS 1, only DCI not including a CIF is transmitted. In the SS 2 and the SS 3, DCI including the CIF is transmitted. The DCI transmitted in the SS 2 and the SS 3 may be DCI for cross-carrier scheduling. The SS 1 may be a common search space. The SS 2 and the SS 3 may be UE-specific search spaces. In addition, the SS 1, the SS 2, and the SS 3 may be separated from each other, or some or all of them may overlap with each other.

A start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 3 below.

$$L \cdot \{(Y_k+m) \bmod \lfloor N_{CCE,k}/L \rfloor\}+i \qquad \text{[Equation 3]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space. In a common search space, $Y_k$ is set to 0 with respect to two aggregation levels L=4 and L=8.

In a UE-specific search space of the aggregation level L, a variable $Y_k$ is defined by Equation 4 below.

$$Y_k=(A \cdot Y_{k-1}) \bmod D \qquad \text{[Equation 4]}$$

Herein, $Y_{-1}=n_{RNTI} \ne 0$, A=39827, D=65537, k=floor($n_s/2$), and $n_s$ denotes a slot number in a radio frame.

Figure 19:
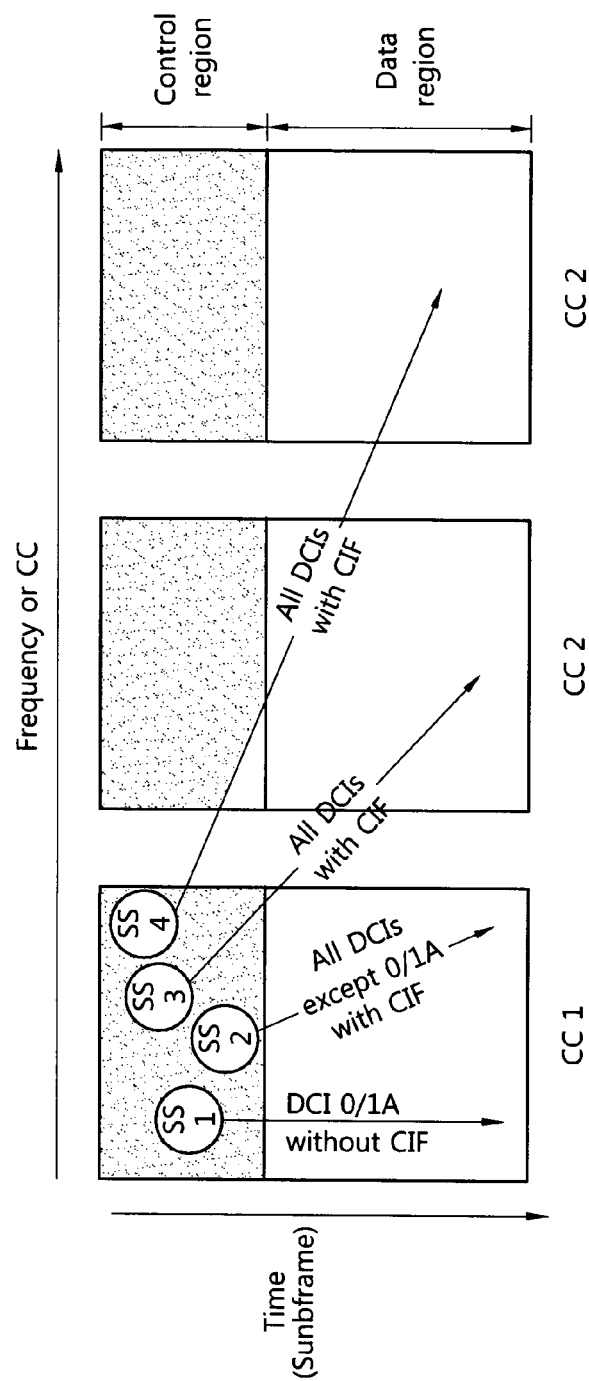
FIG. 19 is another example of a search space in which DCI for non-cross-carrier scheduling is transmitted and a search space in which DCI for cross-carrier scheduling is transmitted.

FIG. 19 is another example of a search space in which DCI for non-cross-carrier scheduling is transmitted and a search space in which DCI for cross-carrier scheduling is transmitted.

In comparison with the example of FIG. 18, the example of FIG. 19 is different in that only a specific DCI (e.g., a DCI format 0 and a DCI format 1A) is transmitted in a format not including a CIF among a plurality of DCIs for non-cross-carrier scheduling. The specific DCI not including the CIF is transmitted in an SS 1. The remaining DCIs for non-cross-carrier scheduling are transmitted in an SS 2. These DCIs may have a format including the CIF. In addition, DCIs for cross-carrier scheduling are transmitted in an SS 3 and an SS 4. Such a method has an advantage in that the number of blind decoding attempts can be decreased since the number of types of DCI to be blind-decoded is limited in the SS 1. The SSs 1, 2, 3, and 4 may be the same SS, or may be different SSs.

Figure 20:
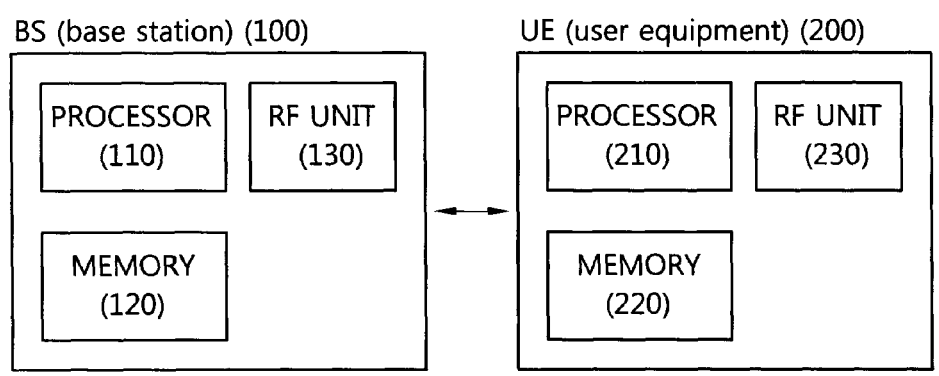
FIG. 20 is a block diagram showing a BS and a UE.

FIG. 20 is a block diagram showing a BS and a UE.

A BS 100 includes a processor 110, a memory 120, and a radio frequency (RF) unit 130. The processor 110 implements the proposed functions, procedures, and/or methods. For example, the processor 110 transmits to the UE a reconfiguration message indicating whether DCI includes a CIF. Further, the processor 110 receives an ACK/NACK signal for the reconfiguration message from the UE, and transmits two types of DCI until a reconfiguration complete message is received from the UE. That is, the processor 110 transmits two types of DCI used before/after the CIF is reconfigured by the reconfiguration message. Thereafter, by receiving the reconfiguration complete message from the UE, the processor 110 confirms whether the reconfiguration is complete. If the reconfiguration is successful, DCI based on a new configuration is transmitted, and if the reconfiguration fails, DCI based on a configuration used before the reconfiguration is transmitted. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives a reconfiguration message indicating whether DCI includes a CIF, and receives a plurality of DCIs indicating a resource used to transmit a reconfiguration complete message in response to the reconfiguration message. Further, the processor 210 transmits the reconfiguration complete message on the basis of resource allocation information included in the DCI which is successfully decoded among the plurality of DCIs.

Alternatively, the processor 210 receives a plurality of DCIs in any one DL CC among a plurality of DL CCs, and transmits a UL signal on the basis of resource allocation information included in any one of the plurality of DCIs. In this case, the plurality of DCIs may include DCI including a CIF and DCI not including the CIF. Any one of the DCIs is DCI not including the CIF, and its format may be predetermined. The UE transmits a reconfiguration complete message in response to a reconfiguration message indicating whether the DCI transmitted by the BS includes the CIF by using resource allocation information included in the DCI not including the CIF.

The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit and/or a converter for mutually converting a baseband signal and a radio signal. The memory 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A communication method of a terminal in a multi-carrier system using a plurality of component carriers, the method comprising:
   receiving a reconfiguration message indicating whether downlink control information (DCI) includes a carrier indication field (CIF);
   transmitting an acknowledgment (ACK)/not-acknowledgement (NACK) signal according to whether the reconfiguration message is successfully decoded;
   receiving a plurality of DCIs indicating a resource used to transmit a reconfiguration complete message in response to the reconfiguration message; and
   transmitting the reconfiguration complete message on the basis of resource allocation information included in DCI which is successfully decoded among the plurality of DCIs,
   wherein the plurality of DCIs include first DCI used before the CIF if the DCI is reconfigured by the reconfiguration message and second DCI used after the CIF if the DCI is reconfigured by the reconfiguration message,
   wherein if the terminal transmits the ACK signal, the reconfiguration complete message is transmitted on the basis of resource allocation information included in the second DCI,
   wherein if the terminal transmits the NACK signal, the reconfiguration complete message is transmitted on the basis of resource allocation information included in the first DCI, and
   wherein the first DCI does not include the CIF, and the second DCI includes the CIF.

2. The method of claim 1, wherein the reconfiguration message is transmitted using a radio resource control (RRC) signal.

3. The method of claim 1, wherein the reconfiguration complete message includes information indicating a success of the reconfiguration or information indicating a failure of the reconfiguration according to the reconfiguration message.

* * * * *